United States Patent
Jiang et al.

(10) Patent No.: US 9,941,960 B2
(45) Date of Patent: Apr. 10, 2018

(54) METHOD AND SYSTEM FOR OPTICAL PERFORMANCE MONITORING

(71) Applicants: Zhiping Jiang, Kanata (CA); Jianhong Ke, Kanata (CA)

(72) Inventors: Zhiping Jiang, Kanata (CA); Jianhong Ke, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/189,330

(22) Filed: Jun. 22, 2016

(65) Prior Publication Data

US 2017/0373751 A1 Dec. 28, 2017

(51) Int. Cl.
| | | |
|---|---|---|
| *H04B 17/00* | (2015.01) | |
| *H04B 10/079* | (2013.01) | |
| *H04B 10/54* | (2013.01) | |
| *H04J 14/02* | (2006.01) | |

(52) U.S. Cl.
CPC ..... *H04B 10/07955* (2013.01); *H04B 10/541* (2013.01); *H04J 14/021* (2013.01)

(58) Field of Classification Search
CPC . H04L 27/2602; H04L 5/0048; H04L 1/0041; H04L 5/005; H04W 52/42; H04W 28/06; H04B 7/0413; H04N 21/2383

(Continued)

(56) References Cited

U.S. PATENT DOCUMENTS

| | | | | |
|---|---|---|---|---|
| 7,991,079 B2* | 8/2011 | Mujtaba | ............... | H04L 27/2628 370/310 |
| 2005/0047496 A1* | 3/2005 | McIntire | ............... | H04L 7/0091 375/222 |

(Continued)

FOREIGN PATENT DOCUMENTS

| | | |
|---|---|---|
| CN | 1267979 A | 9/2000 |
| CN | 101015156 A | 8/2007 |

(Continued)

OTHER PUBLICATIONS

Li, Shiyang, "Research on Pilot-Tone Based on High Speed DWDM System", A Master Thesis, University of Electronic Science and Technology of China, Jun. 30, 2013.

(Continued)

*Primary Examiner* — Don N Vo

(57) ABSTRACT

An aspect of the disclosure provides methods and systems for encoding a data bit stream onto a pilot tone signal. Another aspect of the disclosure provides method and systems for pilot tone detection. In both, a coded pilot tone signal is encoded using a code sequence $m_1$ for each bit value of 1 ($b_1$) and a code sequence $m_0$ for each bit value of 0 ($b_0$) of a data bit stream including pilot tone data bit values of 1 ($b_1$) and bit values of 0 ($b_0$), with each code sequence having multiple coding bits in the duration of each bit. Pilot tone detection can further include decoding each code sequence of the coded pilot tone signal using a plurality of successive overlapping measurement windows. In some embodiments each measurement window is of the same duration, being of the duration of each code sequence, and detecting each code sequence comprises selecting one of the plurality of measurement windows to represent a complete code sequence.

29 Claims, 14 Drawing Sheets

(58) Field of Classification Search
USPC .......................................................... 398/34
See application file for complete search history.

(56) References Cited

U.S. PATENT DOCUMENTS

| | | | | |
|---|---|---|---|---|
| 2010/0046360 | A1* | 2/2010 | Tsuboi | H04J 11/0069 370/210 |
| 2010/0208834 | A1* | 8/2010 | van Zelst | H04B 7/0447 375/267 |
| 2014/0178065 | A1 | 6/2014 | Mertz et al. | |

FOREIGN PATENT DOCUMENTS

| | | |
|---|---|---|
| CN | 102281133 A | 12/2011 |
| CN | 103731228 A | 4/2014 |
| CN | 105164988 A | 12/2015 |
| EP | 2642676 A1 | 9/2013 |
| WO | 9909720 A1 | 2/1999 |
| WO | 2011096759 A3 | 11/2011 |
| WO | 2015116501 A1 | 8/2015 |

OTHER PUBLICATIONS

Min et al., "Study of PDM-CO-OFDM System Pilot Structure", Optical Communication Technology, Dec. 31, 2015.
Li et al., "Estimation and Compensation of Sampling Clock Frequency Offset in Coherent Optical OFDM Systems with a Pilot-aided Method", Acta Photonica Sinica, vol. 44(1), Jan. 31, 2015.
International Search Report dated Oct. 31, 2016 for corresponding International Application No. PCT/CN2016/074144 filed Feb. 19, 2016.
International Search Report dated Feb. 6, 2017 for corresponding International Application No. PCT/CN2016/091050 filed Jul. 22, 2016.
International Search Report dated Dec. 23, 2016 for corresponding International Application No. PCT/CN2016/105173 filed Nov. 9, 2016.

* cited by examiner

METHOD AND SYSTEM FOR OPTICAL PERFORMANCE MONITORING

TECHNICAL FIELD

This disclosure relates to optical performance monitoring using pilot tones.

BACKGROUND

In optical networks, for example dense wavelength division multiplex (DWDM) systems, a plurality of channels are multiplexed. The term channel is used to refer to a wavelength channel, also known as an optical frequency channel. In many such systems, a pilot tone is used for optical performance monitoring (OPM). The pilot tone is a small and low-frequency modulation (e.g. kHz to MHz) applied to a high-speed optical channel. A pilot tone provides an in-band ancillary channel for performance monitoring. Each channel is modulated with a different pilot tone (frequency). Accordingly, the power of a particular pilot tone can be useful for indicating the power of the high speed optical channel in a wavelength division multiplexed (WDM) system.

Some prior art systems modulate pilot tone signals with a data signal used to carry channel-characterizing information, e.g. modulation format, baud rate, source/destination. Modulating the pilot tone with channel information is useful, as the pilot tones of all the DWDM channels can be detected using a low speed detector without needing to demultiplex the DWDM signal. However, conventional pilot tone data modulation typically uses on/off keying (OOK) modulation, which means there is no power in the pilot tone signal for each zero bit of data. This means the presence of the high speed optical signal can no longer be detected for each zero bit of pilot tone data. This can be particularly problematic when there is a number of successive zero data bits in the pilot tone data signal.

Accordingly there is a need for an improved pilot tone method and system.

SUMMARY

Aspects of the invention provide systems and methods for transmitting and detecting pilot tones which encode channel information An aspect of the disclosure provides method for encoding a data bit stream onto a pilot tone signal. Such a method includes receiving the data bit stream comprising bit values of 1 ($b_1$) and bit values of 0 ($b_0$) and converting the data bit stream into a coded data stream which includes a code $m_1$ for each $b_1$ and a code $m_0$ for each $b_0$. Such a method further includes encoding the pilot tone signal with the coded data stream to produce a coded pilot tone signal. Some embodiments further include comprising modulating a high speed data signal with the coded pilot tone signal. In some embodiments code $m_1$ is a multiple binary sequence according to a first pattern and code $m_0$ is a multiple binary sequence according to a second pattern. In some embodiments each bit ($b_1$) and ($b_0$) of the data bit stream has a duration $T_{PT}$; each code ($m_1$) and ($m_0$) has a duration $T_{Code}$, such that $T_{PT}=(1+F)T_{Code}$ where 0<F; and the coded data stream includes a repeated portion of each code for each data bit, with the length of each repeated portion being $F \times T_{Code}$. In some embodiments F=¼. In some embodiments the repeated portion is appended to the end of the each code and includes the initial portion of the code sequence. The initial portion of the code includes the initial binary sequences of the code.

Another aspect of the disclosure provides an encoder for encoding a high speed data signal with a pilot tone. Such an encoder includes a pilot tone carrier signal generator for generating a pilot tone carrier signal. Such an encoder further includes a converter for converting an incoming data bit stream to be transported using the pilot tone into a coded data stream, the data bit stream including bit values of 1 ($b_1$) and bit values of 0 ($b_0$), and the coded data stream including a code $m_1$ for each $b_1$ and a code $m_0$ for each $b_0$. Such an encoder further includes an encoder unit for encoding the pilot tone carrier signal with the coded data stream to produce a coded pilot tone signal. In some embodiments the encoder unit comprises a multiplier. In some embodiments code $m_1$ is a multiple binary sequence according to a first pattern and code $m_0$ is a multiple binary sequence according to a second pattern. In some embodiments each bit ($b_1$) and ($b_0$) of the data bit stream has a duration $T_{PT}$; each code ($m_1$) and ($m_0$) has a duration $T_{Code}$, such that $T_{PT}=(1+F)T_{Code}$ where 0<F; and the coded data stream includes a repeated portion of each code for each data bit, with the length of each repeated portion being $F \times T_{Code}$. In some embodiments F=¼. In some embodiments the repeated portion is appended to the end of the each code and includes the initial portion of the code sequence. The initial portion of the code includes the initial binary sequences of the code.

Another aspect of the disclosure provides a method for pilot tone detection. Such a method includes receiving an optical signal. Such a method further includes detecting a coded pilot tone signal, the coded pilot tone signal encoded using a code sequence $m_1$ for each bit value of 1 (b1) and a code sequence $m_0$ for each bit value of 0 ($b_0$) of a data bit stream comprising pilot tone data bit values of 1 ($b_1$) and bit values of 0 ($b_0$), with each code sequence having multiple coding bits in the duration of each bit. Such a method further includes decoding each code sequence of the coded pilot tone signal using a plurality of successive overlapping measurement windows. In some embodiments each measurement window is of the same duration, being of the duration of each code sequence, and detecting each code sequence comprises selecting one of the plurality of measurement windows to represent a complete code sequence. In some embodiments selecting includes cross-correlating each measurement, made using one of the plurality of measurement windows, with each code sequence to determine which code sequence has the higher power reading for each measurement; and selecting an optimal phase for the measurement with highest power reading for each pilot tone data bit. Some embodiments further include using each selected optimal phase to determine each received code sequence. In some embodiments, determining which code sequence has the higher power reading for each measurement includes determining a power (Pm1 and Pm0) for each code sequence and wherein using each selected optimal phase comprises comparing the Pm1 and Pm0 at the optimal sampling phase. Some embodiments further include producing an output data bit stream including the corresponding bit value for each determined code sequence. Some embodiments further include adjusting the sampling to adjust for clock differences in clocks between the clock of the transmitter which transmitted the received signal and the clock of the receiver which receives the signal. In some embodiments the coded pilot tone signal includes a repeated portion of each code for each data stream bit, with the length of each repeated portion being $F \times T_{Code}$ wherein each bit ($b_1$) and ($b_0$) of the data bit stream has a duration $T_{PT}$, each code ($m_1$)

and ($m_0$) has a duration $T_{Code}$, such that $T_{PT}=(1+F)T_{Code}$ where F≤1 and wherein each measurement window has a duration $T_{Code}$ and each measurement window is offset by a step size of F×$T_{Code}$. In some embodiments a loss of signal flag is set as soon as a loss of power is detected. In some embodiments the loss of signal flag is set within the duration of a single bit.

A further aspect of the disclosure provides a Pilot Tone Detector (PTD). Such a PTD includes a low-speed photodiode and a digital signal processor (DSP), or some other processing system. The DSP is configured detecting a coded pilot tone signal, the coded pilot tone signal encoded using a code sequence m1 for each bit value of 1 (b1) and a code sequence m0 for each bit value of 0 (b0) of a data bit stream comprising pilot tone data bit values of 1 (b1) and bit values of 0 (b0), with each code sequence having multiple coding bits in the duration of each bit; and for decoding each code sequence of the coded pilot tone signal using a plurality of successive overlapping measurement windows. In some embodiments the DSP is further configured such that each measurement window is of the same duration, being of the duration of each code sequence, and detecting each code sequence comprises selecting one of the plurality of measurement windows to represent a complete code sequence. In some embodiments the DSP is further configured such that selecting includes cross-correlating each measurement, made using one of the plurality of measurement windows, with each code sequence to determine which code sequence has the higher power reading for each measurement; and selecting an optimal phase for the measurement with highest power reading for each pilot tone data bit. In some embodiments the DSP is configured such that a loss of signal flag is set as soon as a loss of power is detected. In some embodiments the PTD is associated with a node in an optical network which is configured to perform a protection switch upon receiving a loss of signal flag, said node being a pass thru node for the channel for which a loss of signal is detected. The DSP can be configured to perform other method steps as disclosed herein.

The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Conventional pilot tone data modulation uses on/off keying (OOK) modulation, which means power accuracy within a specific time period is dependent upon the proportion of "ones" and "zeroes" in the bit stream during that time period. Embodiments will be discussed which utilizes a pilot-tone based OPM which provides more accurate power measurement, higher pilot-tone data rate, reliable data detection, compared to conventional OOK pilot tones. Embodiments utilize overlapping measurement windows which can allow for more reliable data detection than conventional pilot tone data detection methods. Furthermore, conventional OOK pilot tones may be not as useful are limited for loss of signal (LOS) detection, since there is no power in the pilot tone signal for each zero bit of pilot tone data, and thus LOS is indistinguishable from a zero bit of pilot tone data. Embodiments allow for the pilot tones to be used for fast LOS detection.

Figure 1:
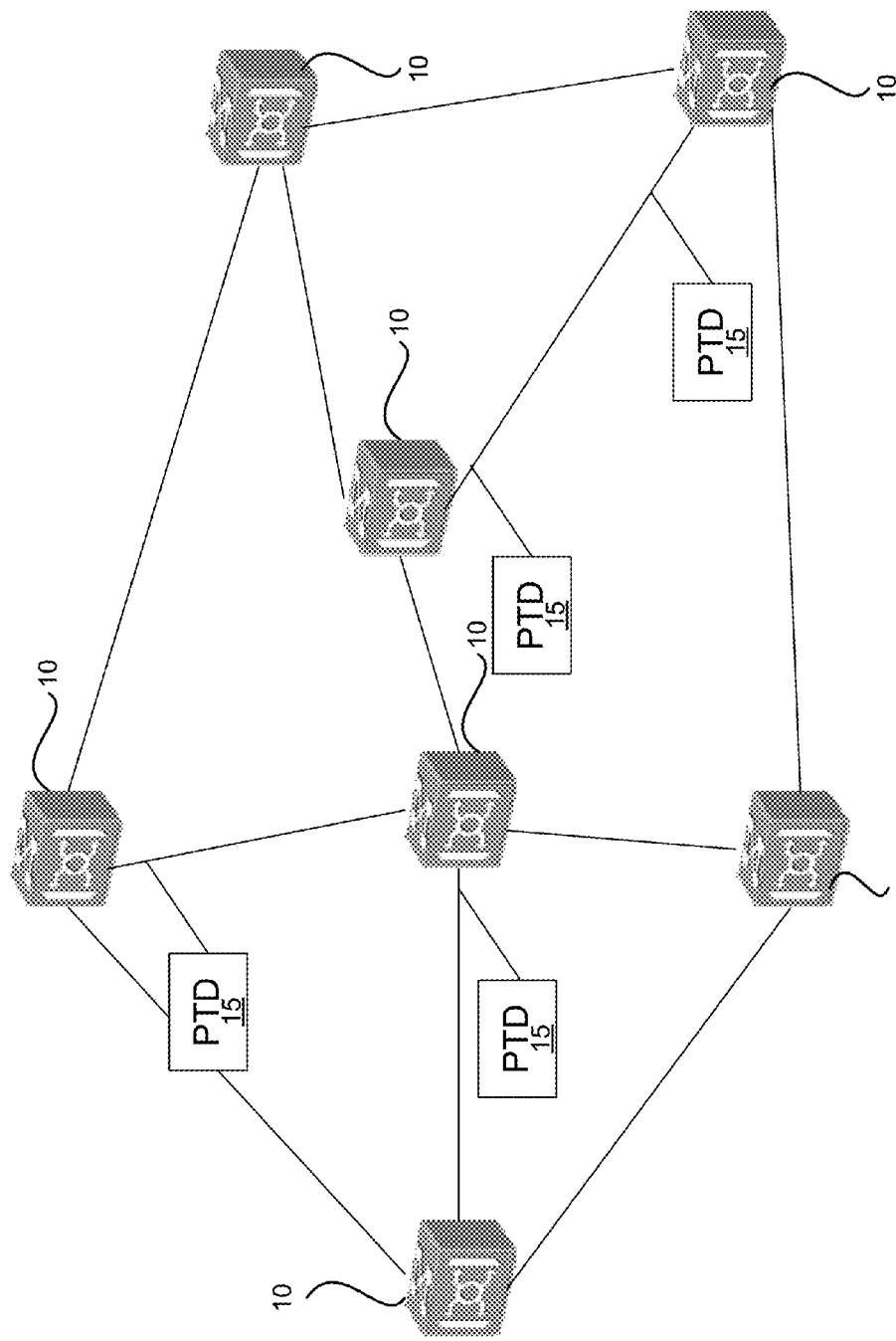
FIG. 1 illustrates an optical network having a plurality of nodes.

As depicted in FIG. 1, an optical network may have a plurality of nodes, each node including a reconfigurable optical add-drop multiplexer (ROADM) 10. A continuous pilot tone signal can be used to monitor the channel power. Such a Pilot tone can be further modulated to carry channel characterizing information. The network may also include a plurality of pilot tone detectors (PTD) 15 at various locations in the optical network to monitor channel information, such as presence and optical power level of individual wavelength channels, modulation format, baud rate, and/or other channel characteristics. While not shown, it should be appreciated that each PTD 15 typically includes a low-speed photodiode and a digital signal processor (DSP).

Figure 2:
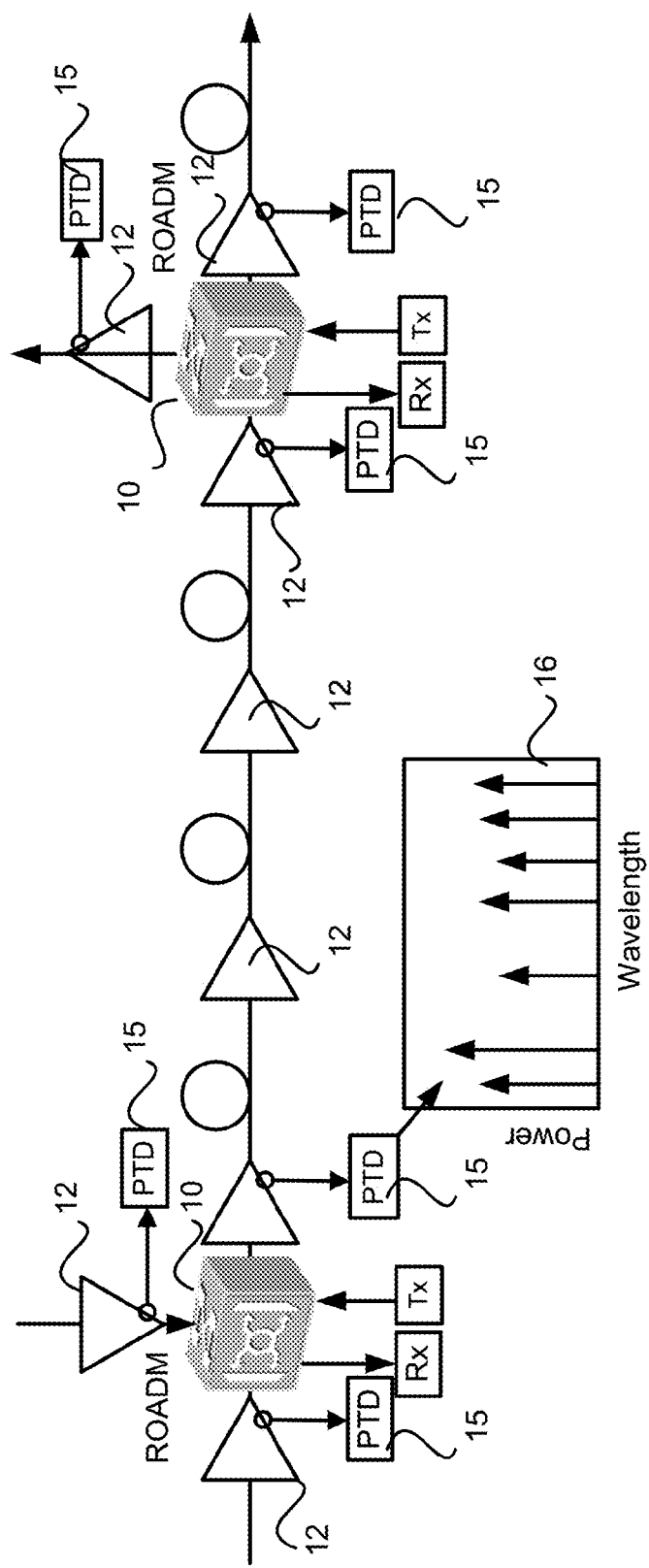
FIG. 2 illustrates more details of link between two ROADMS.

FIG. 2 illustrates more details of link between two ROADMS 10. One ROADM 10 can drop one or more channels from a received DWDM signal at receivers Rx, add one or more channels generated by transmitters Tx, and pass thru other channels. In some cases dropped channels are converted from optical to electrical domains, and added channels are converted from electrical to optical domains. Otherwise, channels are switched or passed thru in the optical domain. A link between ROADMS typically includes a plurality of optical amplifiers 12 for amplifying an optical signal. Each PTD 15 can detect the pilot tones of all the DWDM channels. The power of each pilot tone can be determined e.g. by digital processing, as shown in box 16.

Figure 3:
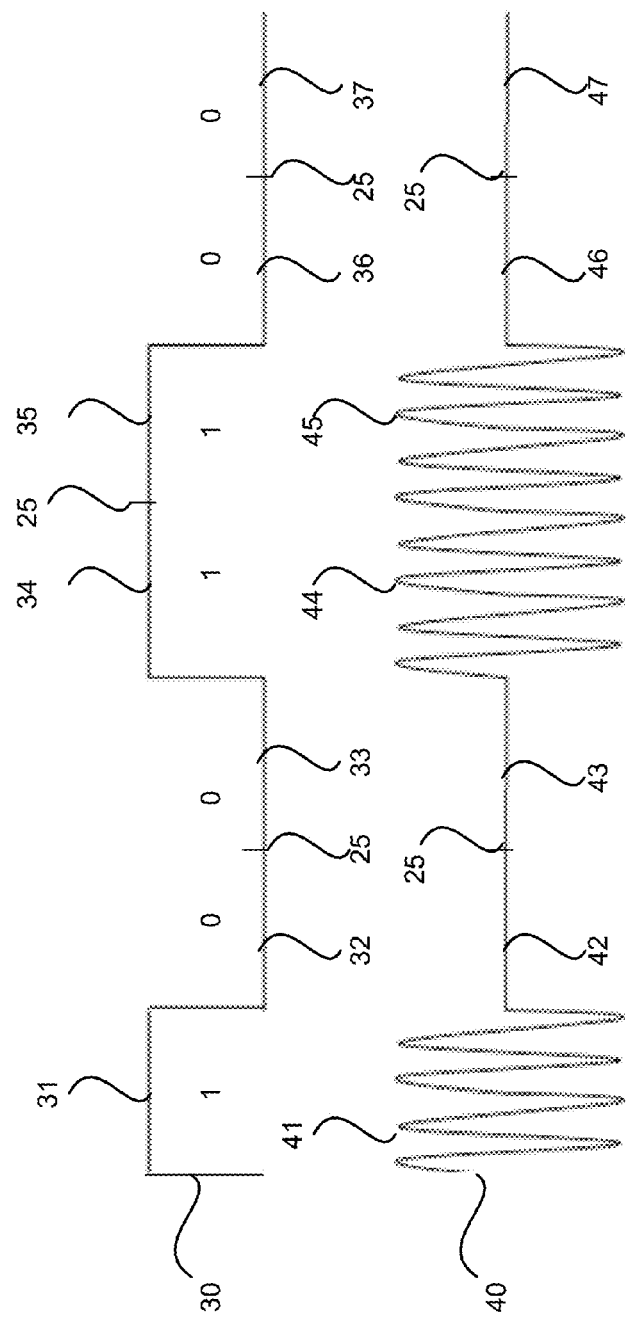
FIG. 3 illustrates the modulation of a pilot tone carrier using conventional on/off keying (OOK) modulation.

FIG. 3 illustrates the conventional on/off keying (OOK) data modulation of a pilot tone. A data bit stream 30 includes a series of bits 31-37. Bits 31, 34 and 35 are 1 bits, and bits 32, 33, 36 and 37 are 0 bits. FIG. 3 includes schematic bit dividers 25 to illustrate where one bit ends and the next bit begins, but it should be appreciated that dividers 25 do not in fact exist. The data bit stream 30 is the channel-characterizing data used to modulate the pilot tone carrier signal to produce a modulated pilot tone signal 40. Using OOK modulation each 1 bit will multiply the amplitude of the pilot tone carrier signal by 1, and each 0 bit will multiply the amplitude of the pilot tone carrier signal by 0, resulting in the signal 40. In signal 40, portions 41-47 correspond to bits 31-37. As can be seen the portions 42, 43, 46 and 47 have zero power. A problem with this approach is that during portions 42, 43, 46 and 47 (corresponding to 0 bits), the PTD cannot detect the presence of the pilot tone, which can degrade the OPM process which relies on detecting the pilot tone power. As most data signals have on average an equal number of 1 bits and 0 bits, this means the pilot tone power cannot be detected half of the time (as a conventional PTD cannot detect the power for the duration of each 0 bit). Further, as the number of 0 bits for any given time period may vary a lot, the system does not provide predictable power accuracy for any small period of time. This is a problem for applications in which fast detection of the presence of the pilot tone is important, and this problem is increased for systems which utilize power averaging to suppress noise.

Stated another way, a reason for implementing pilot tones is for detecting the power for each channel. This is achieved by modulating a high speed data signal with a pilot tone carrier signal and then subsequently detecting the power of the pilot tone. In addition, some systems transmit channel information by modulating the pilot tone carrier signal with a data bit stream (which corresponds to the channel information). While using a pilot tone to transmit channel information has benefits, doing so interferes with and slows down detecting the presence of the pilot tone, and therefore the underlying high speed data signal which it modulates. However the quick detection of underlying high speed data signal is one of the reasons to use a pilot tone. Accordingly embodiments will now be discussed which mitigate this problem.

A method of modulating a high speed data signal with a pilot tone which itself carries information will now be discussed according to an embodiment. The method includes receiving data bit stream corresponding to the channel information to be carried by the pilot tone signal, the data bit stream including bit values of 1 ($b_1$) and bit values of 0 ($b_0$). The method further includes producing a coded data stream which includes a code $m_1$ for each $b_1$ and a code $m_0$ for each $b_0$ of the original data bit stream. Each code is a multiple binary sequence having multiple coding bits. Code $m_1$ is a multiple binary sequence according to a first pattern and code $m_0$ is a multiple binary sequence according to a second pattern. A pilot tone signal is then encoded with the coded data stream to produce a coded pilot tone signal. In some embodiments the encoding includes multiplying (i.e., a pilot tone signal is multiplied with the coded data stream to produce the coded pilot tone signal). The coded pilot tone signal can then be used to modulate the high speed data signal. Such a coding scheme can be deciphered by a suitably configured PTD to recreate the data bit stream such that the signal will have a detectable power during both $b_1$ and $b_0$ bits.

Some embodiments structure the modulation code sequence to help the PTD recover the pilot data bit stream. Methods for decoding the modulated pilot tone signal will be discussed below. Very briefly, some embodiments select the modulation scheme to take into account factors such as a lack of training sequence and the fact that the receiver clock will not be synchronized to the pilot tone transmitter clock (because the channels (each carrying its own pilot tone) may come from different nodes in the optical network).

In some embodiments, each pilot tone data bit ($b_1$ or $b_0$) has a duration of $T_{PT}$ and each code ($m_1$) and ($m_0$) has a duration $T_{Code}$ such that $T_{PT}=(1+F)T_{Code}$ where $0<F$. The coded data stream includes one complete code (m1 or m0) and a repeated beginning portion of the code for each pilot-tone data bit, with the length of each repeated portion being $F \times T_{Code}$. Code $m_1$ is a multiple binary sequence according to a first pattern and code $m_0$ is a multiple binary sequence according to a second pattern. In some embodiments, each code ($m_1$) and ($m_0$) can be based on a pseudo random bit sequence (PRBS), although it will be appreciated that other equivalent or suitable codes may be utilized. In some embodiments, $F \leq 1$ to improve efficiency. The number of measurements in each pilot-tone bit is $(1+F)/F$. Keeping this number small has the benefit of minimizing the processing resources. On the other hand, the pilot-tone data efficiency is proportional to $1/(1+F)$. In some embodiments F is approximately ¼ which is a compromise between these factors.

Mathematically the optical power with this kind of pilot-tone can be described as $$I(t)=I_0(1+f_C(t)m \sin(\omega_{PT}t))$$

where $f_C(t)$ is the applied code function, including code m1 for bit1 and m0 for bit0; $\omega_{PT}$, is the pilot-tone circular frequency, and m is the modulation depth.

Figure 4:
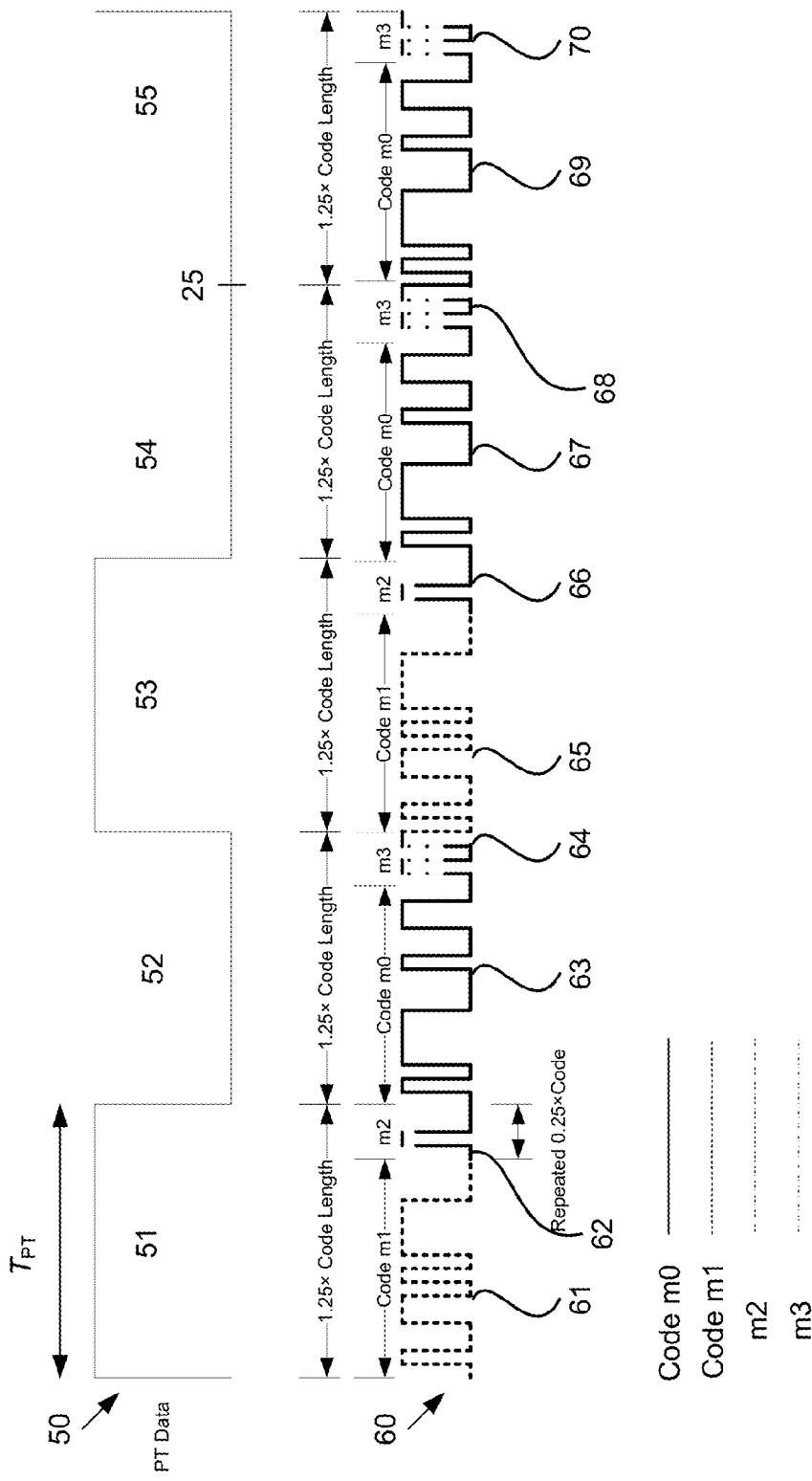
FIG. 4 illustrates an example data bit stream and corresponding modulation code stream, according to an embodiment.

FIG. 4 illustrates an example data bit stream and corresponding coded data stream, according to an embodiment. In this example, F=0.25, such that PT bit duration equals 1.25×code length, and the step size is 0.25×code length. FIG. 4 includes a PT data bit stream 50 including bits 51-55, with separator 25 again just to show separation of two successive 0 bits but not being present. As stated, in this example, $T_{PT}$=1.25×the code length. Accordingly, the corresponding coded data stream 60 has each bit replaced with the corresponding code, plus a repeated beginning portion of 0.25×the code length. Accordingly each 1 bit is replaced by code $m_1$ plus repeated beginning portion m2 and each 0 bit is replaced with code $m_0$ and repeated portion m3. Code $m_1$ is shown in dotted lines and code $m_0$ is shown in solid line, as indicated in the legend at the bottom of the figure, which also shows the line types for m2 and m3. In some embodiments each code includes $2^7-1$ code sequences, which provides a compromise between improving discrimination (improved by longer sequences) and decreasing the computation complexity.

Accordingly the data bit stream 50 is converted into the coded data stream 60 which includes code $m_1$ 61 and repeated portion m2 62 replacing bit 51; code $m_0$ 63 and repeated portion m3 64 replacing bit 52; code $m_1$ 65 and repeated portion m2 66 replacing bit 53; code $m_0$ 67 and repeated portion m3 68 replacing bit 54; and code $m_0$ 69 and repeated portion m3 70 replacing bit 55.

Figure 5:
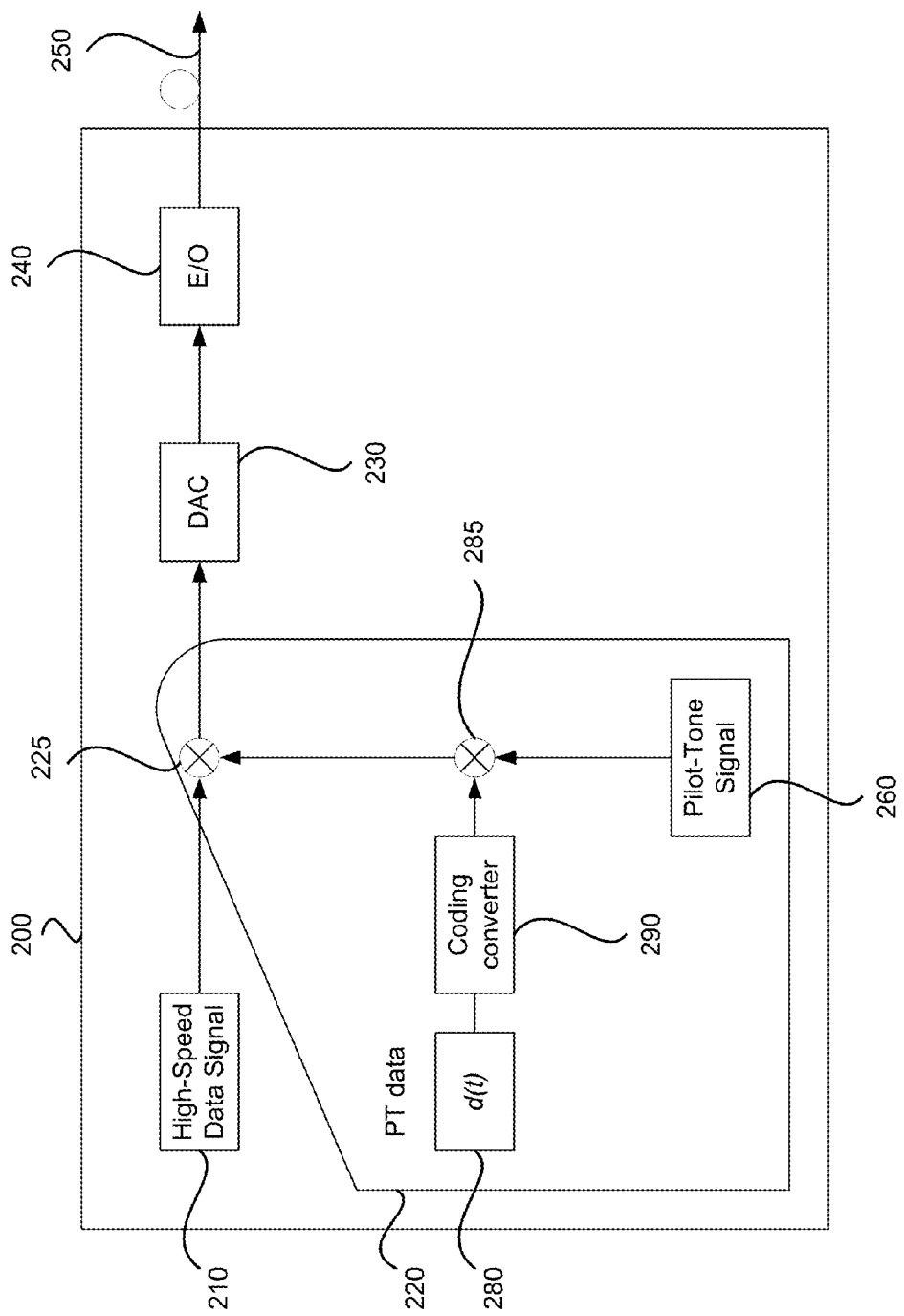
FIG. 5 is a block diagram illustrating an optical transmitter including a pilot tone modulator, according to an embodiment.

FIG. 5 is a block diagram illustrating an optical transmitter including a pilot tone generator, according to an embodiment. In the embodiment depicted by way of example in FIG. 5, an optical transmitter 200 includes a high-speed data signal input 210, a pilot-tone generator 220, a digital-to-analog (DAC) converter 230 and an electrical-to-optical (E/O) converter 240. The optical transmitter transmits the modulated optical signal over an optical link 250. It should be appreciated that for some optical systems there may be multiple modulator units 220 for each E/O converter 240. For example, for a coherent transmitter, there are 4 data streams: an I and Q phase for each X and Y polarization. Accordingly such a transmitter would include four generator blocks 220. Typically in such a system the DAC would have 4 outputs for a single E/O converter 240.

In the embodiment illustrated in FIG. 5, the pilot tone encoder 220 includes a pilot tone frequency generator 260 for generating a pilot tone carrier signal and a PT data generator 280 for producing a data bit stream d(t) to be carried by the pilot tone. In other embodiments the generator 280 is replaced by a receive interface which receives the PT data bit stream from another module. The PT data bit stream is passed to coding converter 290 which converts the data bit stream into a coded data stream as discussed. The generator 220 also includes multiplier 285 for multiplying the coded data stream with the pilot tone signal, and a second multiplier 225 to modulate the pilot tone onto the high-speed data signal. It is noted that generator 220 in this embodiment operates in the digital domain to produce a coded pilot-tone signal which subsequently encodes the high-speed data signal, again in the digital domain prior to DAC and E/O. However, as this has the effect of modulating an optical high-speed data signal with the coded data stream, and indeed alternative embodiments could physically modulate an optical signal with the coded data stream, the term modulation is used. Note that in the transmitter 200, there may be more than one high speed data/DAC path, as discussed above.

Figure 6:
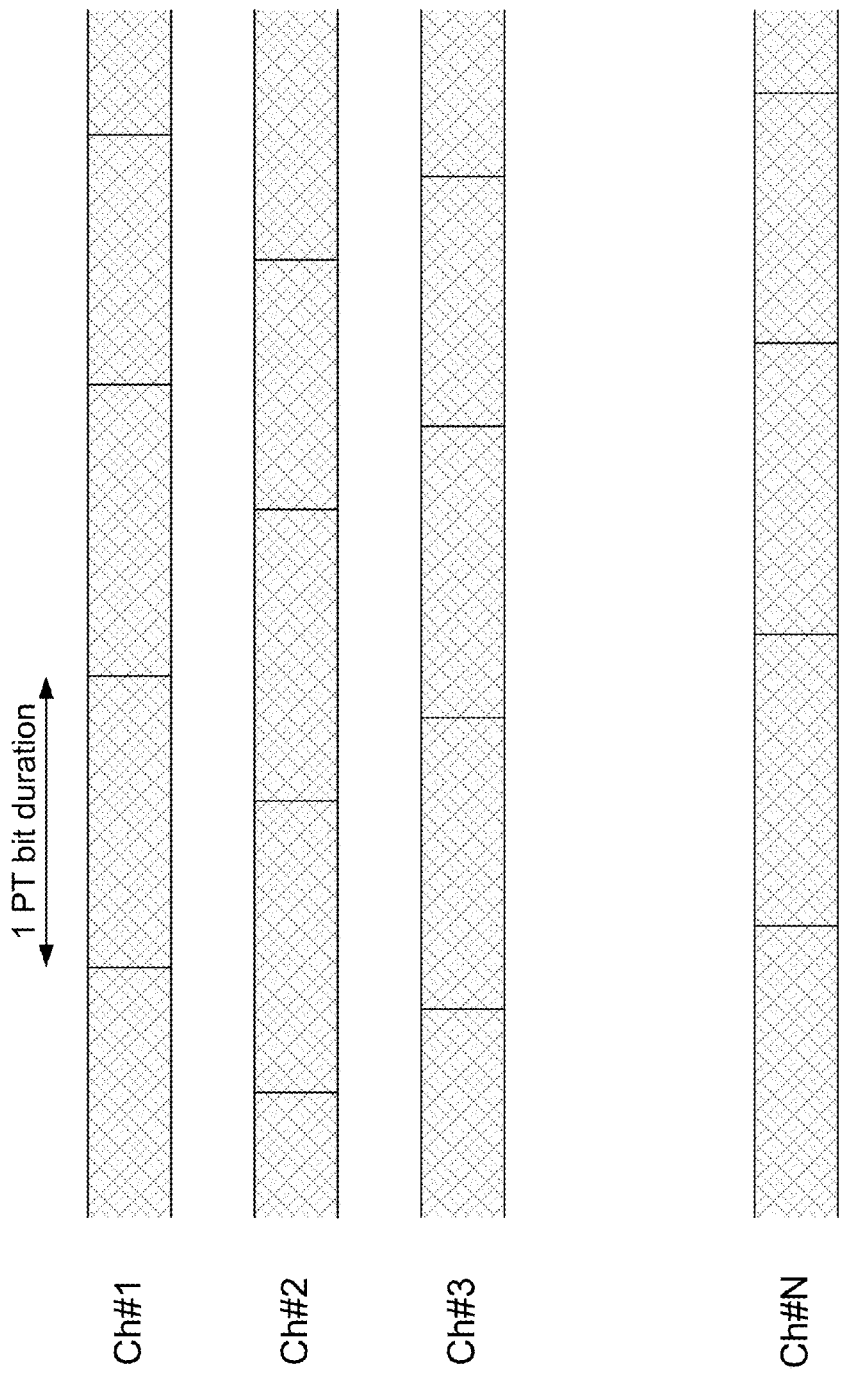
FIG. 6 illustrates multiple PT channels, according to an embodiment.

FIG. 6 illustrates some of the challenges a PTD must overcome when trying to detect multiple pilot-tones of DWDM channels. FIG. 6, shows each PT bit duration being offset (e.g., beginning time for each PT bit duration is different) due to the channels not being synchronized, which may result from different channels entering the network from different nodes. Further the pilot-tone bit duration between channels can vary slightly different due to different clock frequencies in the transmitters which produced each channel.

The detected signal usually contains many channels, each having a pilot tone of unique frequency. The following description describes an example of the detection of one pilot tone. It should be appreciate that such a process is performed for each pilot tone of interest. Also the detection algorithm described here assumes the pilot-tone carrier frequency is removed, which can be done for example by frequency down conversion.

Figure 7:
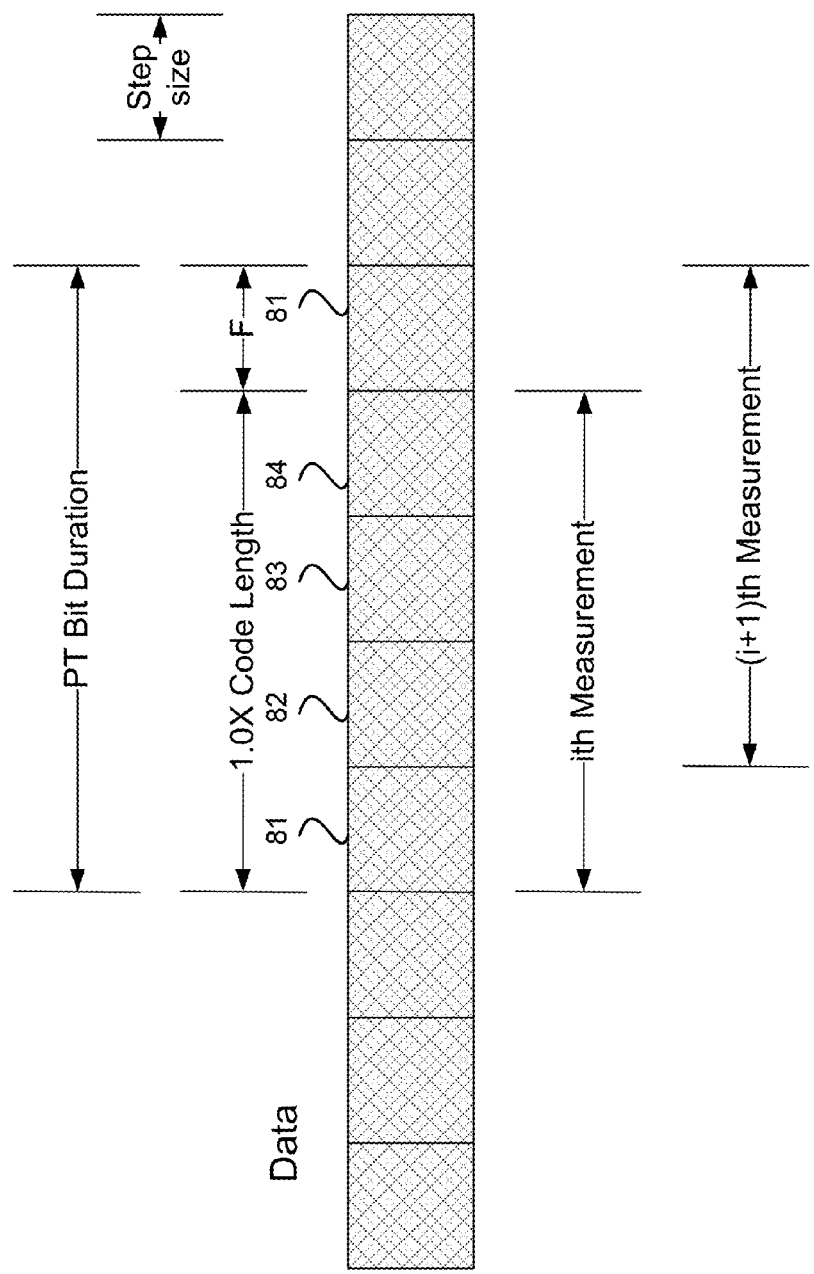
FIG. 7 illustrates a pilot tone decoding method according to an embodiment.
Figure 8:
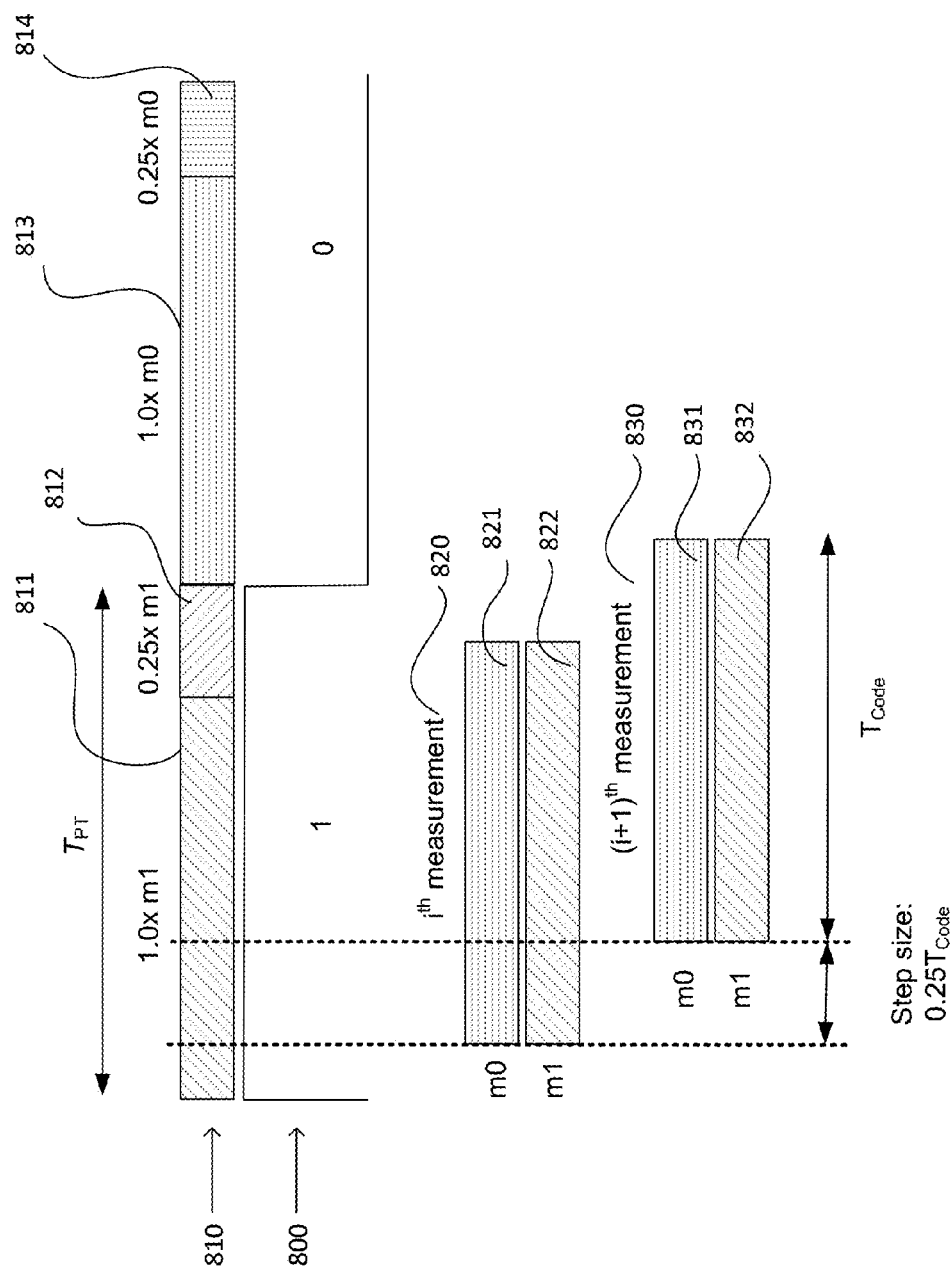
FIG. 8 illustrates further details of a pilot tone decoding method according to an embodiment.

FIG. 7 illustrates a pilot tone detection method according to an embodiment. FIG. 7 shows a received pilot-tone signal, for example by a PTD 15 at the pilot-tone frequency; i.e., extracted from the high speed data signal with the PT applied. FIG. 7 illustrates a pilot-tone detection method in order to measure the PT power and extract the PT data bit stream information carried by the PT. However, there is no simple mechanism to let the receiver know where each code begins (for different pilot tones, their corresponding codes may begin at different times). Accordingly multiple measurements are made window by window for each PT data bit. Of course, a single measurement of a pilot signal time trace may be sliced into multiple overlapping windows for subsequent digital processing. For simplicity, the term "multiple measurements" is to be understood as including cases where the single measured time trace is separated into multiple overlapping windows. The length of each measurement window equals the code length $T_{Code}$, and the time step size is equal to $F*T_{Code}$, which means the adjacent measurement windows are partially overlapped, and offset by the step size. The number of measurements in a PT data bit is (1+F)/F. With this number of measurements, there is at least one measurement that contains a complete code within a PT data bit duration. In the example shown, corresponding to the example shown in FIG. 4, F=0.25, the PT bit duration equals 1.25×code length, and the step size is 0.25×code length. Accordingly the partially overlapping measurements are each offset by 0.25×code length. Therefore there are 5 measurement windows for each PT bit duration, as (1+0.25)/0.25=5. Accordingly each PT bit duration can be considered to have 5 segments (segments 81-84 plus repeated segment 81). Each of the measurements includes 4 segments and each successive measurement shifts by one of those segments. Over the 5 measurements, usually one measurement contains a complete code (if the measurement window happens to be aligned with the PT bit, then there are two measurements containing a complete code). FIG. 8 illustrates further details of a pilot tone detection method according to an embodiment. FIG. 8 illustrates using cross-correlation between PT encoded signal and each of the two detection codes ($m_1$ and $m_0$). A data bit stream 800 is encoded to form a coded pilot tone signal 810 using code sequence $m_1$ 811 and $m_0$ 813, along with repeated portions $m_2$ 812 and $m_3$ 814. For the $i^{th}$ measurement 820, two powers are obtained after being decoded by code $m_0$ 821 and $m_1$ 822, and expressed as $Pm_0(i)$ and $Pm_1(i)$, respectively. Similarly, for the $(i+1)^{th}$ measurement 830, two powers $Pm_0(i+1)$ and $Pm_1(i+1)$ are obtained after the decoding. Circular cross-correlation is used to detect the pilot-tone power at each measurement. If a measurement window contains a complete code sequence for m1 or m0, then the detected m1 power (decoded using m1) or m0 power (decoded using m0) has a measurement at the full power level. However, if the measurement window only contains a portion of the m1 or m0 code sequence, then the detected m1 power or m0 power has a measurement less than the full power level.

Figure 9:
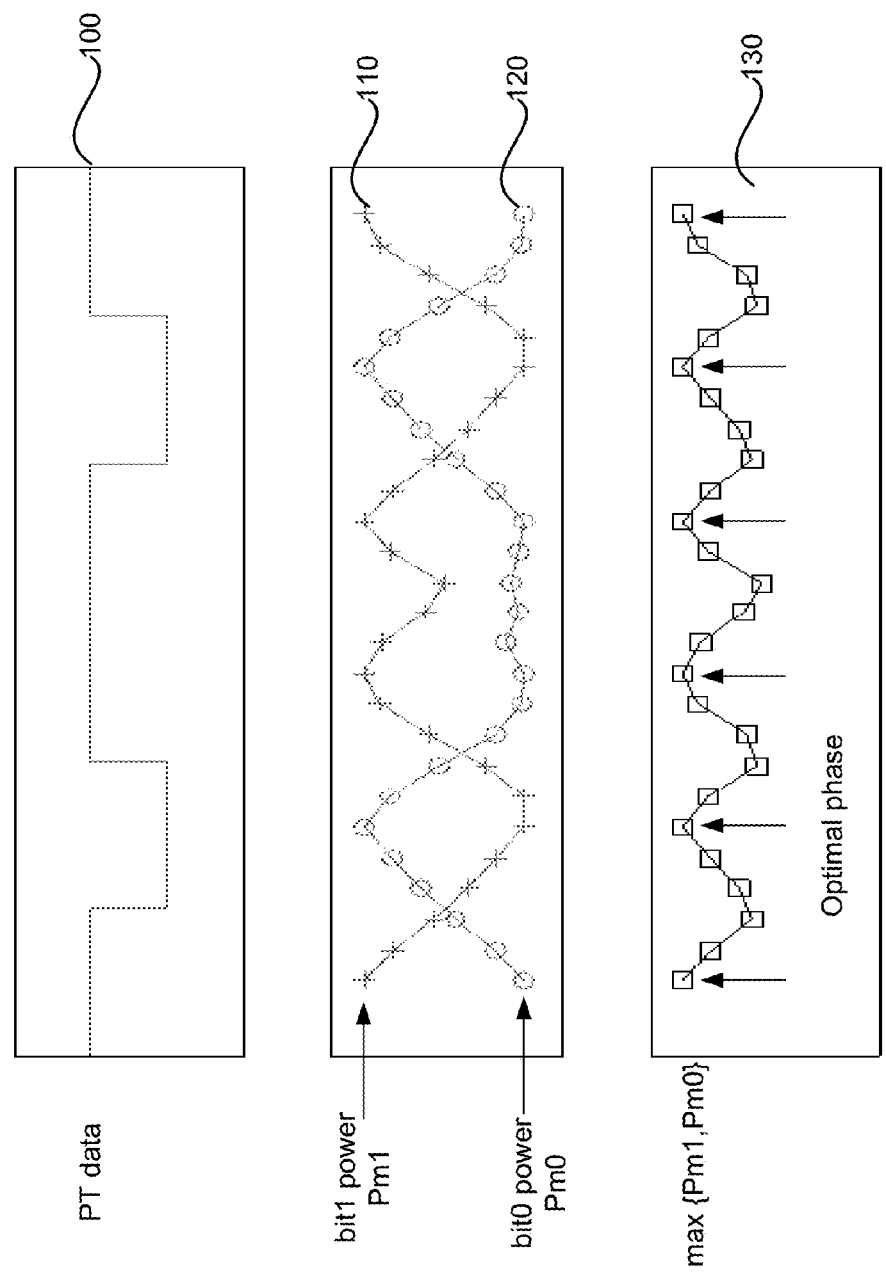
FIG. 9 illustrates a phase detection method according to an embodiment.

In this example, once 5 measured pilot-tone power readings are made for every pilot-tone data bit (i.e., 5 measurement window power measurements are made), the method determines the actual pilot tone power, and then recovers the pilot-tone bits. In order to do so, the system selects one of the 5 measurements as the correct measurement to use, in a process referred to as phase detection. FIG. 9 illustrates decoded powers and corresponding optimal phase according to an embodiment. Accordingly for a PT data stream 100, FIG. 9 illustrates a plot of bit 1 power measurements ($Pm_1$) in curve 110 and bit 0 power measurements ($Pm_0$) in curve 120. Intuitively by looking at these two curves, the peaks of each curve indicate whether the bit is a 1 or 0. For an automated method, an optimal sampling phase is determined in order to obtain correct PT power. Curve 130 illustrates how the peak location of max{Pm1,Pm0} corresponds to the optimal bit sampling phase.

Figure 10:
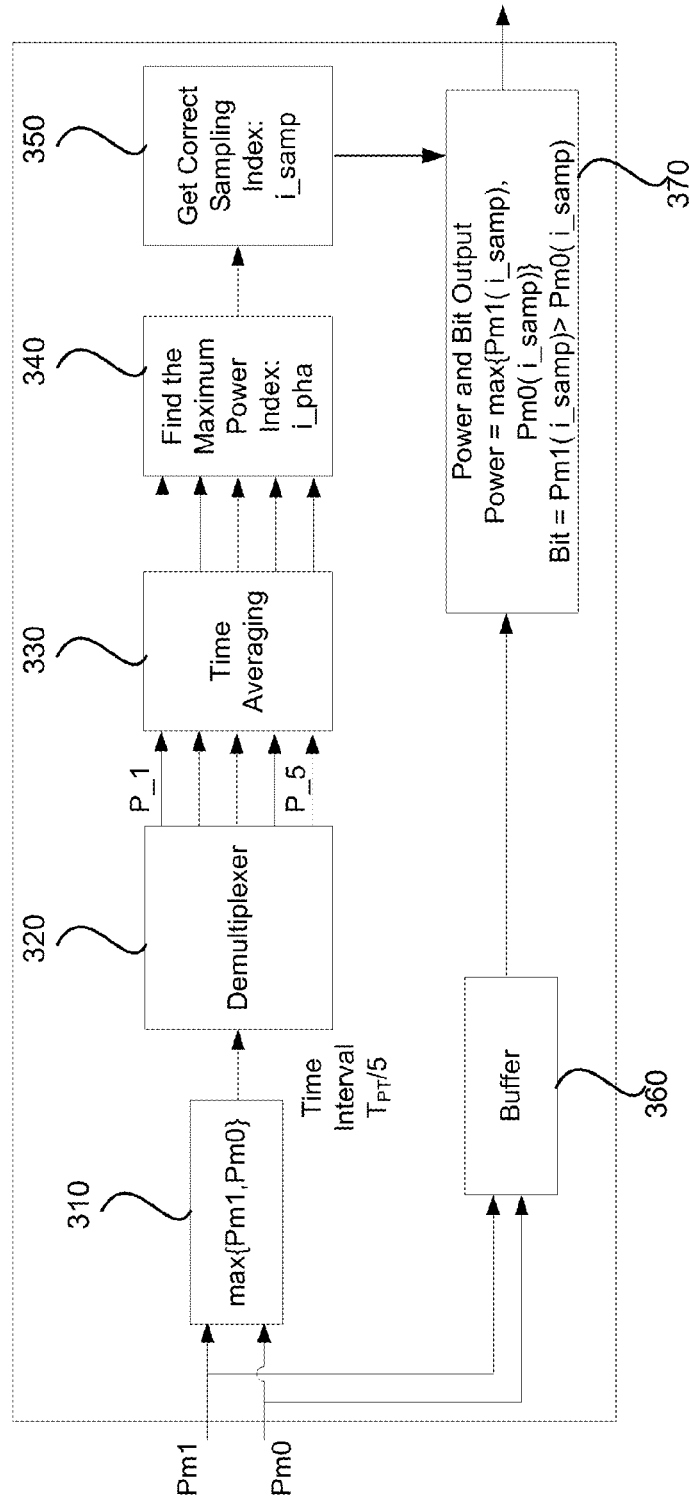
FIG. 10 is a block diagram illustrating a phase selection method according to an embodiment.

FIG. 10 is a block diagram illustrating a phase selection method according to an embodiment. The maximum power of Pm0(i) and Pm1(i) at 310 is demultiplexed by demultiplexer 320 into 5 paths P_1 . . . P_5. After time averaging 330 for suppressing noise, the index of the maximum power of the five paths (i_pha) is obtained 340, wherein i_pha is an integer between 1 to 5 representing the optimal phase index. The optimal sampling index (i_samp) can be obtained based on the optimal phase i_pha at step 350.

The optimal sampling phase is used to sample the $Pm_1$ and $Pm_0$ readings from buffer 360 to determine the correct power and bit output at 370. Power for each bit is obtained using Power=max{Pm1(i_samp), Pm0(i_samp)}, noting that with the use of codes m1 and m0, each portion of the PT modulated signal representing a bit has a non-zero power, even for the 0 bits.

Once the best measurement (for each bit) is detected, it is converted to the corresponding bit to recover the original data bit stream. Accordingly, embodiments then produce an output data bit stream. In the embodiment shown, the bit decision is made by comparing the powers Pm1(i_samp) and Pm0 (i_samp), respectively. Accordingly:

if Pm1(i_samp)>Pm0(i_samp), then the system outputs a 1 bit; and if Pm1(i_samp)<Pm0(i_samp), then the system outputs a 0 bit.

Figure 11:
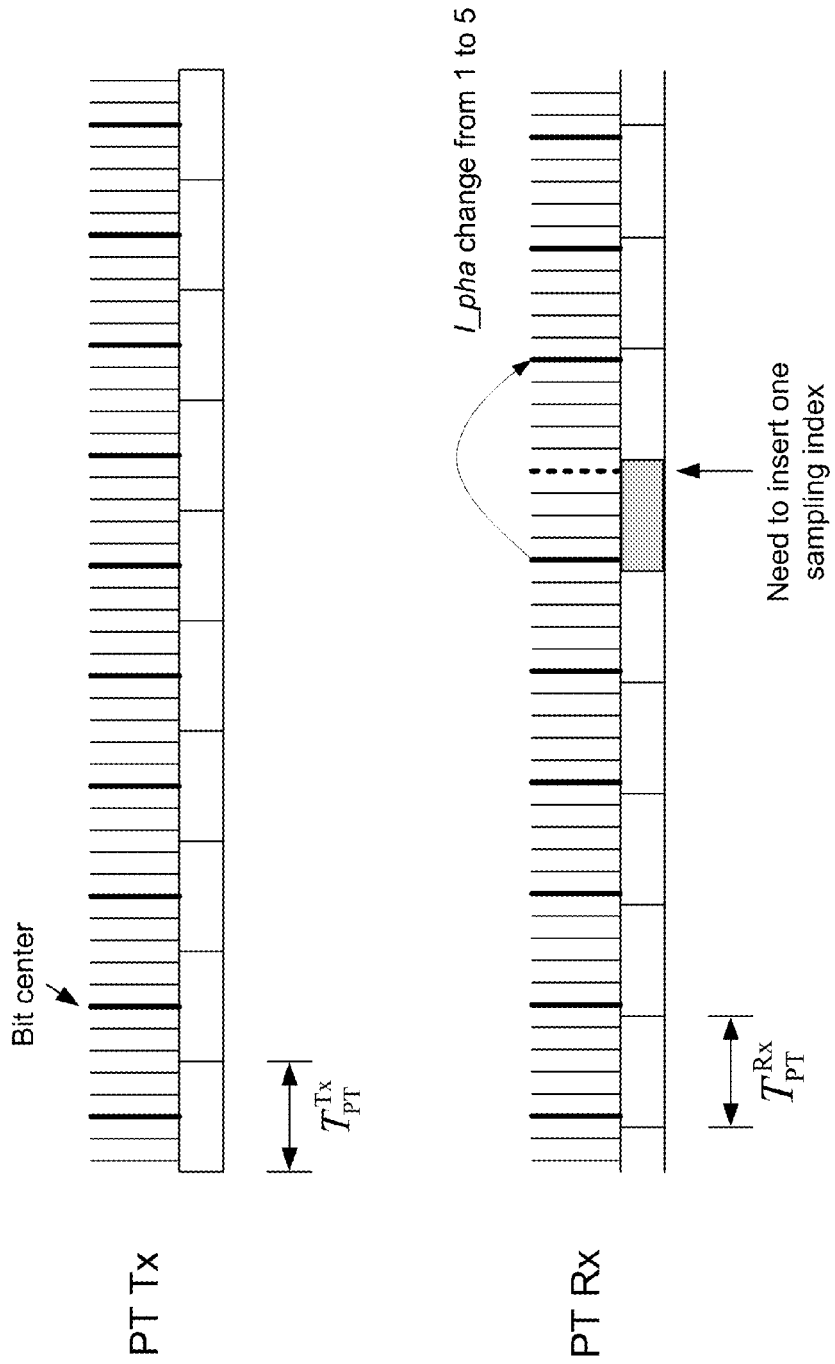
FIG. 11 illustrates why inserting a phase sampling index is required when the Rx clock frequency is slower than the Tx clock according to an embodiment.
Figure 12:
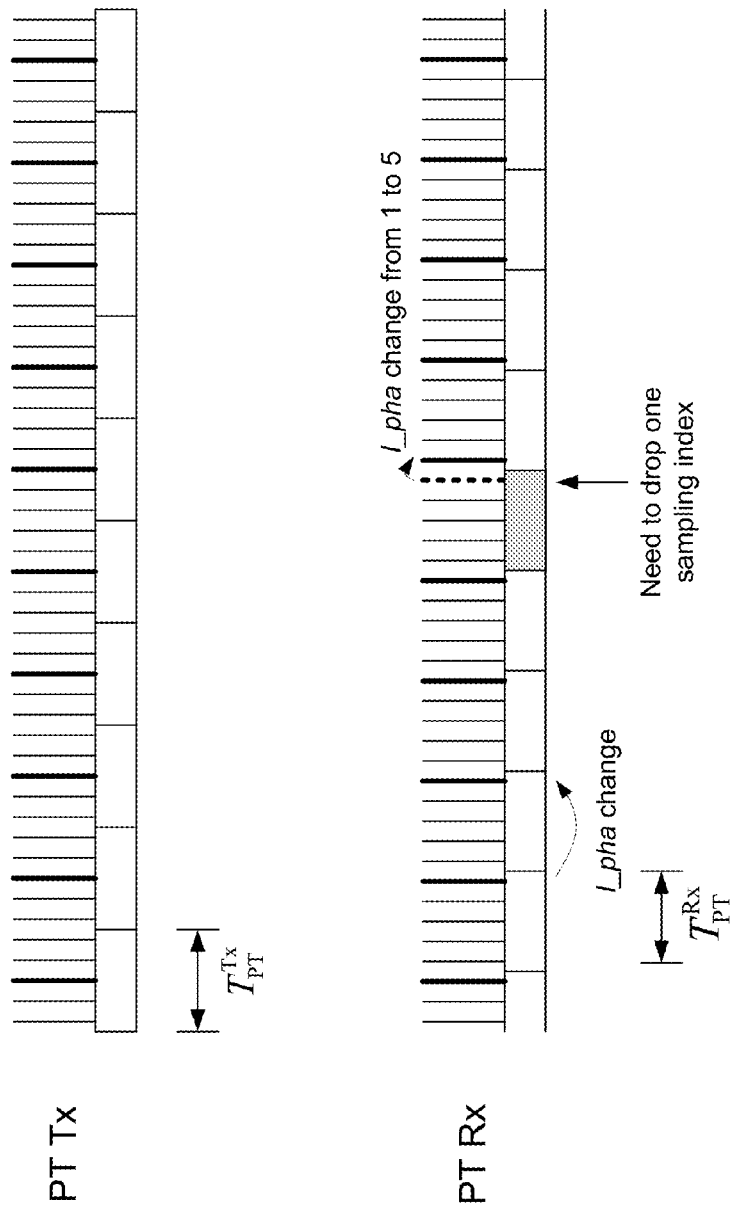
FIG. 12 illustrates why dropping a phase sampling index is required when the Rx clock frequency is faster than the Tx clock according to an embodiment.

If there's a clock difference between pilot-tone Tx and Rx clocks, the optimal phase i_pha will change gradually with time. If i_pha changes directly from 1 to 5 or from 5 to 1 (i.e., not through 2,3,4 or 4,3,2), one sampling index i_samp should be added or dropped to prevent slips. FIGS. 11 and 12 illustrate such a method, according to an embodiment. In both figures the bold vertical line indicates the optimal phase. The optimal sampling index i_samp should be the closest one to the Tx optimum phase. The empty blocks indicate PT data bit durations. Each bit has 5 measurements; correspondingly, each block contains 5 vertical lines. The bold vertical lines indicate the optimum phases.

FIG. 11 illustrates why inserting a phase sampling index is required when the Rx clock frequency is slower than the Tx clock according to an embodiment. If i_pha changes directly from 1 to 5, one sampling index should be added. When Rx clock frequency is slower than the Tx clock, the Rx bit duration is slightly larger than Tx bit duration. Correspondingly, the intervals of the vertical lines at Rx side are slightly larger than that of Tx. At the first bits, the optimum phase is 1. Then for the shaded block, there are two possible optimum phases (1 or 5) according to the Tx optimum phases. However, for one particular bit duration, only one optimal phase is selected based on the scheme shown in FIG. 10. For example, phase 1 is selected as the optimum phase for this block. Then the optimum phase at the next block is 5. Therefore, one optimal sampling phase is missed. In this case, one sampling phase index should be added, as shown in the dashed line.

Figure 13:
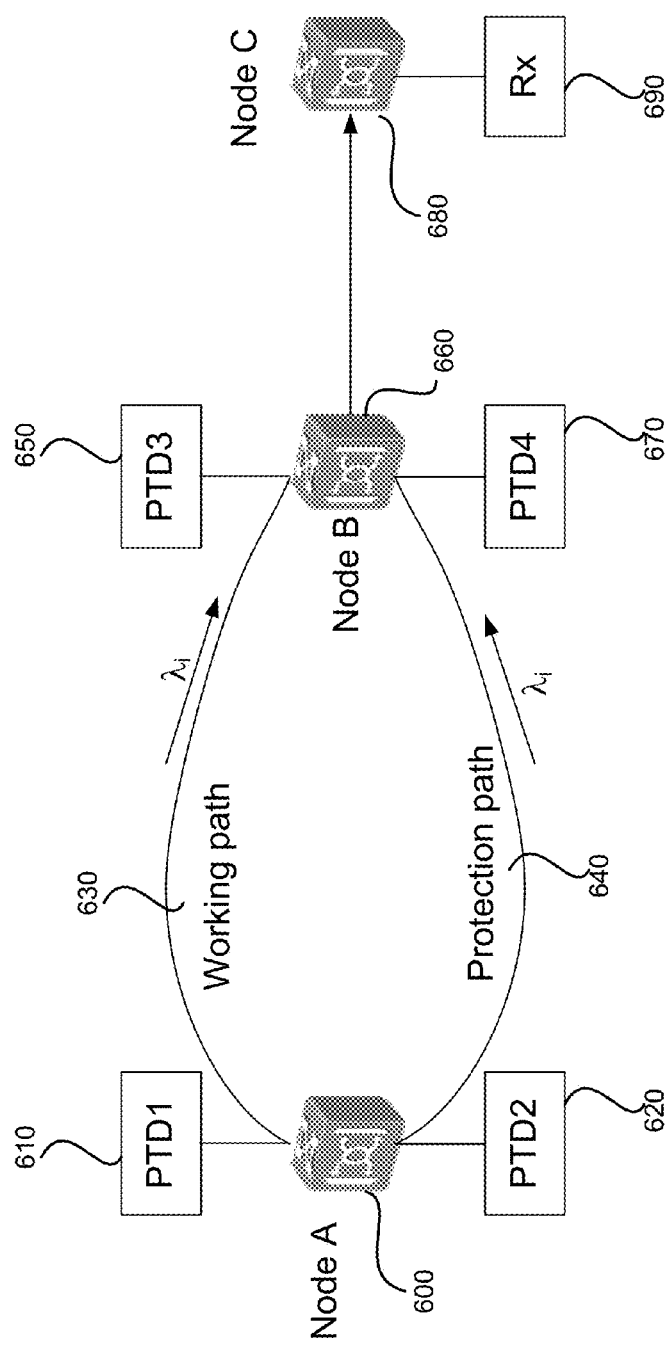
FIG. 13 illustrates a Loss of Signal (LOS) application according to an embodiment.

FIG. 12 illustrates why dropping a phase sampling index is required when the Rx clock frequency is faster than the Tx clock according to an embodiment. If i_pha changes directly from 5 to 1, one sampling index should be dropped FIG. 13 illustrates a LOS application according to an embodiment. FIG. 13 illustrates Node A 600 and Node B 660 with working path 630 and protection path 640 used to transport a signal with wavelength $\lambda_i$. Four PTDs are illustrated, PTD1 610, PTD2 620, PTD3 650 and PTD4 670. Each PTD can include a low-speed photodiode and a digital signal processor (DSP) or other processing system which (includes a processor and machine readable memory storing instructions which when executed by the processor) implements the pilot tone decoding methods discussed herein. The figure also illustrates Node C 680 is actually the node with receiver 690 designated to receive channel $\lambda_i$. Accordingly, although both the working path 630 and protection path 640 connect through Node B 660, Node B 660 only acts a pass-thru node for channel $\lambda_i$. For optical layer protection/restoration, it is important to detect optical channel LOS as quickly as possible. Traditionally, the receiver Rx is used for LOS detection, where a signal is broadcast from a Tx on both the working and protection paths and a selector at the Receiver determined if a protection switch should be made (ie., selects which of the protection and working paths to receive). In other words, for conventional systems the Rx must be at the same node with the selector.

However, embodiments provide sufficiently quick LOS detection that a PTD can now be used as a part of a selector. For example, if PTD3 650 detects a LOS of channel $\lambda_i$ in the working path 630, then Node B 660 (which can include PTD 3 650) can select the channel $\lambda_i$ in the protection path 640. In such a system, the Rx does not have to be at the same node with the selector.

Figure 14:
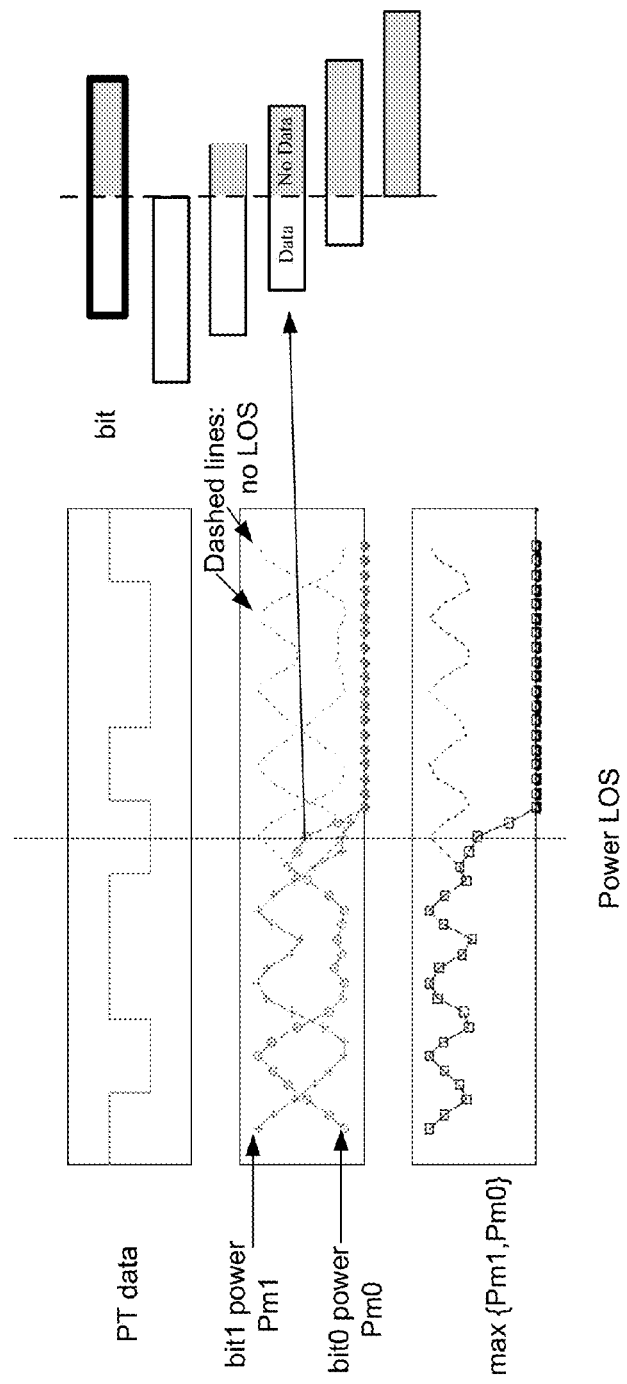
FIG. 14 illustrates detecting a LOS according to an embodiment.

FIG. 14 illustrates detecting a LOS according to an embodiment. Unlike in conventional systems, in which the absence of power in the PT signal (eg. Portions 42 and 43 in FIG. 3) indicates a zero bit, and therefore does not indicate a LOS condition, embodiments using the methods and systems can determine an LOS immediately even in the middle of a 0 bit. As can be seen in FIG. 14, which is similar (initially) to FIG. 9, power can be detected for each bit in the PT signal, even the 0 bits. Accordingly when a Power LOS occurs (as marked by the vertical line) the bit power curves for both $Pm_1$ and $Pm_0$ immediately drop when the LOS occurs, as does the value of max{Pm1,Pm0}. When this occurs a LOS condition to be declared. Appropriate signaling can be made in response, for example to trigger protection switching.

Through the descriptions of the preceding embodiments, the present invention may be implemented by using hardware only or by using software and a necessary universal hardware platform. Based on such understandings, the technical solution of the present invention may be embodied in the form of a machine readable memory which includes a number of instructions that enable a processor (for example a DSP) to execute the methods provided in the embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method for encoding a data bit stream onto a pilot tone signal comprising:

receiving the data bit stream comprising bit values of 1 (b1) and bit values of 0 (b0);

converting the data bit stream into a coded data stream which includes a code m1 for each b1 and a code m0 for each b0; and encoding the pilot tone signal with the coded data stream to produce a coded pilot tone signal, wherein the steps of receiving, converting and encoding are performed by an encoder configured to receive the data bit stream, convert the received data bit stream into the coded data stream, and encode the pilot tone signal with coded data stream.

2. The method of claim 1 further comprising modulating, by the encoder, a high speed data signal with the coded pilot tone signal.

3. The method of claim 1 wherein code m1 is a multiple binary sequence according to a first pattern and code m0 is a multiple binary sequence according to a second pattern.

4. The method of claim 3 wherein:

each bit (b1) and (b0) of the data bit stream has a duration TPT;

each code (m1) and (m0) has a duration TCode;

such that TPT=(1+F)TCode where 0<F; and
the coded data stream includes a repeated portion of each code for each data bit, with the length of each repeated portion being F×TCode.

5. The method of claim 4 wherein F=¼.

6. The method of claim 4 wherein the repeated portion is appended to the end of the each code and includes an initial portion of the code sequence.

7. The method of claim 6 wherein the initial portion of the code sequence includes initial binary sequences of the code.

8. An encoder for encoding a high speed data signal with a pilot tone comprising:
a pilot tone carrier signal generator for generating a pilot tone carrier signal;
a converter for converting an incoming data bit stream to be transported using the pilot tone into a coded data stream, the data bit stream including bit values of 1 (b1) and bit values of 0 (b0), and the coded data stream including a code m1 for each b1 and a code m0 for each b0; and
an encoder unit for encoding the pilot tone carrier signal with the coded data stream to produce a coded pilot tone signal.

9. The encoder of claim 8 wherein the encoder unit comprises a multiplier.

10. The encoder of claim 8 wherein code m1 is a multiple binary sequence according to a first pattern and code m0 is a multiple binary sequence according to a second pattern.

11. The encoder of claim 10 wherein:
each bit (b1) and (b0) of the data bit stream has a duration TPT;
each code (m1) and (m0) has a duration TCode;
such that TPT=(1+F)TCode where 0<F; and
the coded data stream includes a repeated portion of each code for each data bit, with the length of each repeated portion being F×TCode.

12. The encoder of claim 11 wherein F=¼.

13. The encoder of claim 11 wherein the repeated portion is appended to the end of the each code and includes an initial portion of the code sequence.

14. The encoder of claim 13 wherein the initial portion of the code sequence includes initial binary sequences of the code.

15. A method for pilot tone detection comprising:
receiving, by a pilot tone detector (PTD), an optical signal;
detecting a coded pilot tone signal, the coded pilot tone signal encoded using a code sequence m1 for each bit value of 1 (b1) and a code sequence m0 for each bit value of 0 (b0) of a data bit stream comprising pilot tone data bit values of 1 (b1) and bit values of 0 (b0), with each code sequence having multiple coding bits in the duration of each bit; and
decoding each code sequence of the coded pilot tone signal using a plurality of successive overlapping measurement windows,
wherein the steps of detecting and decoding are performed by a digital signal processor (DSP) in the PTD that is configured to detect the coded pilot tone signal and to decode each code sequence of the coded pilot tone signal.

16. The method of claim 15 wherein each measurement window is of the same duration, being of the duration of each code sequence, and detecting each code sequence comprises selecting, by the DSP, one of the plurality of measurement windows to represent a complete code sequence.

17. The method of claim 16 wherein selecting comprises:
cross-correlating each measurement, made using one of the plurality of measurement windows, with each code sequence to determine which code sequence has the higher power reading for each measurement; and
selecting an optimal phase for the measurement with highest power reading for each pilot tone data bit.

18. The method of claim 17 further comprising using, by the DSP, each selected optimal phase to determine each received code sequence.

19. The method of claim 17 wherein determining which code sequence has the higher power reading for each measurement includes determining a power (Pm1 and Pm0) for each code sequence and wherein using each selected optimal phase comprises comparing the Pm1 and Pm0 at the optimal sampling phase.

20. The method of claim 18 further comprising producing, by the DSP, an output data bit stream including the corresponding bit value for each determined code sequence.

21. The method of claim 20 further comprising adjusting, by the DSP, the sampling to adjust for clock differences in clocks between the clock of the transmitter which transmitted the received signal and the clock of the receiver which receives the signal.

22. The method of claim 19 wherein the coded pilot tone signal includes a repeated portion of each code for each data stream bit, with the length of each repeated portion being F×TCode wherein each bit (b1) and (b0) of the data bit stream has a duration TPT, each code (m1) and (m0) has a duration TCode, such that TPT=(1+F)TCode where F≤1 and wherein each measurement window has a duration TCode and each measurement window is offset by a step size of F×TCode.

23. The method of claim 15 wherein a loss of signal flag is set, by the DSP, as soon as a loss of power is detected.

24. The method of claim 23 wherein the loss of signal flag is set within the duration of a single bit value.

25. A Pilot Tone Detector (PTD) comprising:
a low-speed photodiode; and
a digital signal processor (DSP) configured for:
detecting a coded pilot tone signal, the coded pilot tone signal encoded using a code sequence m1 for each bit value of 1 (b1) and a code sequence m0 for each bit value of 0 (b0) of a data bit stream comprising pilot tone data bit values of 1 (b1) and bit values of 0 (b0), with each code sequence having multiple coding bits in the duration of each bit; and
decoding each code sequence of the coded pilot tone signal using a plurality of successive overlapping measurement windows.

26. The PTD as claimed in claim 25 wherein the DSP is further configured such that each measurement window is of the same duration, being of the duration of each code sequence, and detecting each code sequence comprises selecting one of the plurality of measurement windows to represent a complete code sequence.

27. The PTD as claimed in claim 26 wherein the DSP is further configured such that selecting comprises:
cross-correlating each measurement, made using one of the plurality of measurement windows, with each code sequence to determine which code sequence has the higher power reading for each measurement; and
selecting an optimal phase for the measurement with highest power reading for each pilot tone data bit.

28. The PTD as claimed in claim 27 wherein a loss of signal flag is set as soon as a loss of power is detected.

29. The PTD as claimed in claim 28 wherein the PTD is associated with a node in an optical network which is configured to perform a protection switch upon receiving a loss of signal flag, said node being a pass thru node for the channel for which a loss of signal is detected.

* * * * *